United States Patent [19]

Szegvari

[11] 3,998,938
[45] Dec. 21, 1976

[54] METHOD AND APPARATUS FOR GRINDING PARTICULATE SOLIDS

[75] Inventor: Andrew Szegvari, Akron, Ohio

[73] Assignee: Union Process International, Inc., Akron, Ohio

[22] Filed: May 10, 1974

[21] Appl. No.: 468,270

Related U.S. Application Data

[63] Continuation-in-part of Ser. No. 387,354, Aug. 10, 1973, abandoned, which is a continuation-in-part of Ser. No. 360,466, May 15, 1973, abandoned, which is a continuation-in-part of Ser. No. 166,421, July 27, 1971, abandoned.

[52] U.S. Cl. .............................. 423/594; 252/62.63; 241/29; 241/46.17
[51] Int. Cl.$^2$ ........................................ C01G 49/02
[58] Field of Search ................... 241/15, 21, 26, 27, 241/46 R, 46.02, 46.11, 46.15, 46.17; 75/123 R; 423/151, 594

[56] References Cited

UNITED STATES PATENTS

| | | | |
|---|---|---|---|
| 2,764,359 | 9/1956 | Szegvari | 241/46.17 X |
| 3,204,880 | 9/1965 | Haller | 241/29 |
| 3,298,618 | 1/1967 | Talpey | 241/46.17 |

Primary Examiner—Granville Y. Custer, Jr.
Attorney, Agent, or Firm—Reed Smith Shaw & McClay

[57] ABSTRACT

Apparatus and method are provided for grinding particulate solids in a liquid media. A pump means repeatedly circulates the liquid containing solids through conducting means to comminuting means, such as agitated-media mill, through the comminuting means and through conducting means back to the pump means at a rate of at least about 30 and preferably between 50 and 300 volumes of liquid continuum containing solids in the comminuting means per hour. Particulate solid materials having substantially greater particle size uniformity and other superior and unique properties are thus produced.

57 Claims, 10 Drawing Figures

METHOD AND APPARATUS FOR GRINDING PARTICULATE SOLIDS

RELATED APPLICATIONS

This application is a continuation-in-part of copending application Ser. No. 387,354, filed Aug. 10, 1973 now abandoned, which is a continuation-in-part of then copending now abandoned application Ser. No. 360,466, filed May 15, 1973, which is a continuation-in-part of then copending, now abandoned application Ser. No. 166,421, filed July 27, 1971.

FIELD OF THE INVENTION

This invention relates to method and apparatus for grinding particulate solids in a liquid continuum.

BACKGROUND OF THE INVENTION

Various methods and apparatus have been known for grinding particulate solids in a liquid media. They include ball mills, pebble mills, roll mills, sand mills, and agitated-media mills. Illustrative art is believed to be U.S. Pat. Nos. 1,577,052, 2,764,359, 2,903,191, 3,008,657, 3,131,875, 3,298,618, 3,149,789 3,204,880, 3,337,140, 3,432,109, 3,591,349, 3,628,965, British Patent Nos. 716,316 and 1,038,153, and German Patent Nos. 1,214,516 and 1,233,237.

The present invention may be performed with various comminuting means such as above mentioned. Typically, however, the invention is performed in agitated-media comminuting apparatus as hereinafter described and claimed wherein the solids in liquid suspension are subjected to generally random contact as well as dynamic screening in a bed of agitated grinding elements. In an agitated-media apparatus, the grinding is usually performed in a vertical cylindrical stationary tank or vessel with a rotatable agitator disposed on a substantially vertical axis. The agitator has one or more solid protuberances such as arms or discs extending out from the axis thereof into a mass of grinding media or elements such as pebbles, or ceramic or metal balls, that occupies a substantial portion of the vessel. The rotation of the protuberances through the mass of grinding media causes the media to occupy an increased apparent volume with the result that the grinding elements have a substantial free space between them and impinge on each other in a manner somewhat similar to the classic model of a gas. The particulate material to be ground and the liquid, which serves as a carrier and dispersing media for the material, occupy the free spaces between the grinding media. The material is ground by the action of the agitated grinding media. A built-in pumping action is usually used to maintain circulation within the comminuting means during grinding.

With respect to the grinding of materials, the present process is applicable to both coarse grinding and fine grinding. It is applicable to the grinding of very hard materials such as iron oxide, of relatively brittle materials such as coal and of relatively soft materials such as clay. The particle size of the solid starting material may vary from particles measuring as little as 325 mesh, or less, to particles measuring as much as ¼ inch in diameter, or larger. The particle size of the solid starting material is not critical. Further, neither the solid or liquid employed, nor the viscosity of the liquid is critical. However, these factors may require selection as will be apparent to those skilled in the art.

It has been recognized that more mass of material may be ground when the size of the comminuting vessel is increased. Agitated-media apparatus of larger size are, however, relatively more expensive to build and operate. It has also been recognized that the large capital outlay for larger size equipment could be avoided by recycling the suspended solids in the liquid continuum between a comminuting means and a large storage tank, see, e.g., U.S. Pat. No. 3,204,880. Recycling has been, however, generally regarded to result in increased grinding time to reduce the solid particles to a predetermined size. Such recycling operation results in large particles appearing in the final product without having been subjected to a sufficient amount of grinding.

The present invention overcomes these difficulties and disadvantages of the prior art above described. It has been found, contrary to what would be expected, that recycling at relatively high flow rates results in reduced grinding times. It would be expected that the grinding time in a recycling operation would never be as short as the grinding time for the same batch of material ground in a grinding means equal in volume to the retaining tank plush the comminuting means without recirculation, or to a series of grinders equal in total volume to the volume of the retaining tank and comminuting means without recirculation. However, applicant has found that, surprisingly, the grinding time for a given batch reduces the relatively high recirculation rates to less than the time to grind the same batch in a single grinding means, or a series of grinders equal in volume to the retaining tank plus comminuting means. The processing capacity of a given size grinding apparatus is thereby increased without the necessity for relatively large and expensive grinding apparatus. Also, the ground solids produced have been found to have unique properties.

SUMMARY OF THE INVENTION

Solids are ground in a liquid contamination at substantially lower cost by repeatedly circulating the liquid containing solids through the comminuting means by a pump means at a rate of at least about 30 and even greater than 300 volumes of liquid continuum containing solids in the comminuting means per hour. That is to say, at least 30 volumes of the liquid dispersion capacity of the comminuting vessel is circulated through the comminuting means per hour. In this connection, it should be noted that the liquid dispersion capacity of the comminuting vessel is preferably about 35 to 50 percent of the total volume of the vessel. The remainder of the total volume of the comminuting vessel is taken up by the grinding elements and agitator. In any case, the grinding elements must be sufficient and restricted to provide for efficient grinding and dynamic sieve action as hereinafter described.

In some embodiments, the liquid containing solids may be circulated directly between the pump means and the comminuting means with the major portion of the liquid slurry in the system in the comminuting means, the excess being in the outlet or retaining chamber from the comminuting means, the pump means, and the conducting means between the pump and comminuting means.

In other embodiments, it may be preferred to circulate the liquid, containing solids, from and through a retaining or storage tank(s) or chamber(s) as well as the comminuting and pump means. In such embodiments, the retaining tank or chamber may take on different sizes and shapes and be integral with or separate from the comminuting means and/or pump means. Where integral with the comminuting means, a jacketed vessel may be provided with the retaining chamber or portion in the jacket space between the inner and outer vessels and the comminuting means in the inner comminuting vessel, or the retaining tank or chamber and comminuting means may be in one vessel separated by a simple retaining screen or the like. In any case, the total volume of the comminuting means may in such instances be several times less than the volume of the retaining chamber, but in other instances preferably is the same volume, or less, than the dispersion capacity of the comminuting means. It is preferred that the circulation be from and through one or two storage tanks or chambers as hereinafter specifically described, but it is understood that three storage tanks may be used in series as the embodiment may require.

The method of grnding comprises first providing a batch of particulate solids to be ground suspended in a liquid continuum. The liquid continuum containing suspended solids is circulated from a pump means through the comminuting means at one end thereof at a rate of at least about 30 volumes and preferably between 50 and 300 volumes of liquid continuum containing solids in the comminuting means per hour. The suspended solids are ground in the comminuting means as they pass with the liquid continuum therethrough and are discharged from the comminuting means with the liquid media at the same rate at an end portion thereof, substantially opposite from the point of circulation to the comminuting means. On discharge, the suspended solids with the liquid continuum are recycled to the pump means, or to a first, second or third retaining chamber, from where the solids with the liquid continuum are recycled back to the comminuting means.

The batch is recycled between the pump means, possibly one or more retaining chambers, and the comminuting means until the solids in the batch are reduced to the desired particle size. Solids and/or liquid may be added to the batch intermittently or continuously during the grinding operation for various reasons. It is recognized by those skilled in the art that the batch once provided may not be supplemented by materials requiring grinding, but rather maintained until the end of the grinding operation when the batch is removed and a new batch is provided. However, with the present invention new particulates can be readily dispersed in the already formed batch so that solids may be added during the grinding to provide an end product of dispersed solids of different desired grinding times and/or of a complex formulation built-up during processing.

The method of grinding is preferably performed with an agitated-media comminuting means, e.g., see apparatus set forth in U.S. Pat. No. 3,149,789, possibly with a storage or retaining chamber with conduit, and pump means for circulation. The liquid containing solids are repeatedly circulated through the agitated-media mill at a velocity such that at least 30 volumes and preferably many volumes more, even up to and greater than 300 volumes of liquid continuum containing solids in the agitated-media vessel per hour. The flow through the agitated-media vessel is preferably in a vetical direction and along the axis of the rotatable agitator within the vessel. To achieve this condition the pump means is provided for causing repeated flow through the comminuting means at a rate of at least 30 volumes and preferably of between 50 and 300 volumes of the comminuting means containing grinding elements per hour of liquid containing solids to be ground. Further, a retaining chamber or portion is preferably provided at outlet portions of the comminuting means separated from the comminuting vessel by a retaining screen for retaining the grinding element in the comminuting means while permitting substantially unrestricted passage of the liquid containing particulate solids from the comminuting means into the retaining chamber. The retaining chamber or portion as hereinafter more fully described is believed to aid in the circulation operation by providing a more uniform flow through the comminuting means.

The flow through an agitated-media grinder may be generally upwardly or downwardly. Preferably, however, the grinding step is accomplished in an agitated-media comminuting means by passing the liquid continuum containing suspended solids preferably substantially upwardly through a bed of agitated grinding elements from bottom to top portions of the comminuting means. More preferred, the vertical progress of the liquid continuum containing the solid suspension through the comminuting means is at least 2 mm per second and preferably between 5 and 50 mm per second.

The present invention is useful in preparing particulate solid material with relatively small particle size and substantial particle size uniformity and other superior and unique properties. Particularly ferromagnetic materials, paint pigments, dye pigments (including phthalo-blues), tungsten carbide, certain carbon blacks and transparent oxides can be prepared which have special properties. The reason for these special properties is believed to be the more uniform particle size distribution of the resulting particulate material.

Other details, objects and advantages of the present invention will become apparent as the following description of the present preferred embodiment thereof and present preferred methods of practicing the same proceeds.

BRIEF DESCRIPTION OF THE DRAWINGS

In the accompanying drawings, the present preferred embodiments of the invention and present preferred methods of practicing the invention are shown, in which.

DESCRIPTION OF THE PREFERRED EMBODIMENTS

Figure 1:
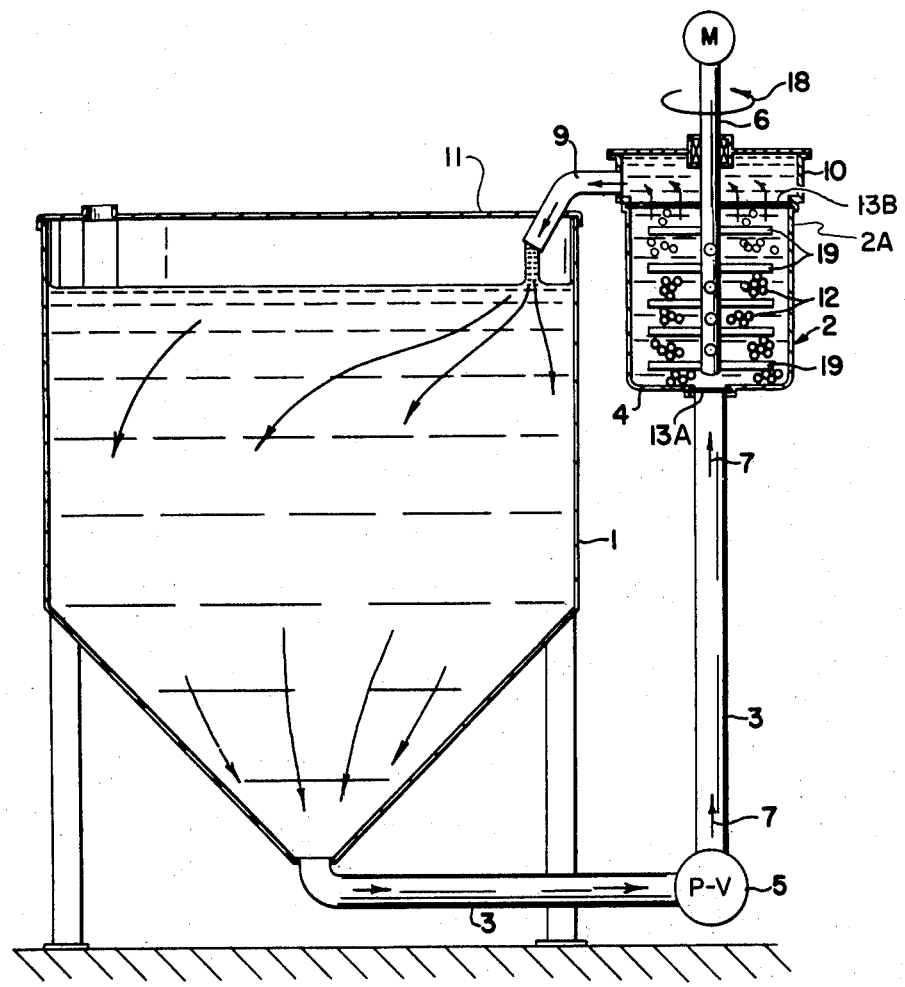
FIG. 1 is an elevational view in cross-section of a grinding apparatus embodying the present invention wherein a separate retaining chamber is employed.

Referring to FIG. 1, apparatus embodying the present invention is shown which comprises relatively large storage tank or chamber 1 and relatively small agitated-media comminuting means 2 contained in comminuting vessel 2A. The volume of comminuting vessel 2A without the grinding elements may, for example, be 10 times smaller in volume than the storage chamber. The agitated-media grinder may, for example, have a 30-gallon dispersion capacity with the grinding elements present so that the dispersion volume of comminuting means 2 is, in turn, approximately 33 times smaller than the volume of the retaining tank.

However, the existence and shape of the retaining tank as well as the difference in volume of the comminuting vessel and the retaining tank are not limiting. Indeed, the retaining tank may be the same or even smaller in volume than the comminuting vessel or nonexistent except for the retention in the conducting means between the pump and the comminuting means. By contrast, the shape of comminuting vessel 2A is important to provide the desired flow conditions. Specifically, the diameter of comminuting vessel 2A is preferably about the same as its height to reduce the resistance to flow through the comminuting means 2.

Agitated-media comminuting means 2 contains grinding elements 12 which are typically steel balls of less than ½ inch in diameter. Alternatively, balls, pebbles, beads and the like of glass, ceramics, stone, tungsten carbide, titanium dioxide, sillimanite and the like, having a diameter of less than ½ inch, may be used as the grinding elements. In any case, the grinding elements are preferably between ⅛ and 5/16 inch in diameter in the typical operation.

Preferably, grinding elements 12 (together with agitator 6) occupy at least about 5 percent of the volume of comminuting means 2 to provide a dense grinding bed on agitation. Stated another way, grinding elements 12 fill comminuting vessel 2A to a level such that less than about 15 percent of the volume of comminuting vessel 2A is free space apart from the grinding elements in an unagitated state so that the grinding elements can expand on agitation not more than about 15 percent of their original volume. The remainder of the space is in the interstices between the unagitated grinding elements and is approximately 36 to 40 percent of the volume to the level occupied by the grinding elements. Most desirably, the grinding elements are filled to a level of about 90 percent of the comminuting vessel, but practically not to a level more than about 95 percent of the comminuting vessel to avoid rapid mechanical failure of the comminuting means during agitation. The optimum density of the grinding element bed will, of course, vary with the viscosity of the slurry, the size, density and shape of the grinding elements, and the rotation speed of the agitator.

To provide for forming the agitated bed, grinding elements 12 in comminuting means 2 overlie protuberances or agitating arms 19 of agitator 6. Shaft of agitator 6 is rotated by motor M as indicated by arrow 18. This rotation causes protuberances or agitating arms 19 thereof to be rapidly passed through the mass of grinding elements 12, thereby causing the grinding elements to occupy a greater apparent volume during grinding than at rest and form a bed of agitated grinding elements.

As shown in FIG. 1, suitable connections are also provided for flow of the liquid media containing suspended solids from retaining or storage tank 1 to comminuting means 2, through comminuting means 2 and then back to storage tank 1. Specifically, a conduit or pipe 3 is provided between lower end portion of retaining tank 1 and lower or bottom portion 4 of the comminuting means 2 by conducting the liquid containing suspended solids to be ground. Suitable means, such as a pump 5 is provided in conduit 3 for causing desire forced flow of liquid continuum containing solids from the lower portion of the retaining tank 1 into lower portion 4 of the comminuting means 2 at a rate greater than 30 volumes and preferably between 50 and 300 volumes of liquid continuum containing solids in the comminuting means per hour.

Conduit 3, preferably of about 1½ to 5 inches in diameter, connects with lower portion 4 near the center axis of rotation of the agitator 6 of the comminuting means 2 so that flow of liquid continuum containing solids is in the direction of the arrows 7 through conduit 3. That is, the flow through the agitated-media comminuting means 2 is preferably in a steadily upwardly vertical direction. In this connection, a chopper (not shown) such as the Delumper made by Franklin Miller, Inc. of East Orange, N.J., is connected in conduit 3 to facilitate flow of the solids particularly through retaining screen 13A as hereafter described. In addition, conduit 9 connects between upper retaining portion 10 adjacent comminuting means 2 and upper portion 11 of tank 1 to provide for return of the liquid media containing solids from the comminuting means back into storage tank 1.

Means such as a suitable retaining screen 13A is provided in lower portion 4 of comminuting vessel 2A to prevent grinding elements 12 from entering conduit 3. Similar retaining screen means 13B is provided at the upper portion of comminuting vessel 2A to form a retaining chamber or portion 10 at outlet portions of comminuting means 2, separate from but integral with means 2 and vessel 2A, that aids in the circulation operation by providing a more uniform unrestricted flow through the comminuting means. Retaining screen means 13A and 13B also restrict the movement of the grinding elements 12 during agitation so that efficient grinding and the dynamic sieve action as hereinafter described is obtained, while permitting substantially unrestricted passage of the liquid containing particulate solids to and from the comminuting means. Storage or retaining tank 1 is also provided with a conical bottom to prevent improper accumulation of solids and to facilitate proper flow.

In operation, a batch of particulate solids to be ground are provided in retaining tank 1 suspended in a liquid continuum. An agitator (not shown) may be provided if desired in the retaining tank to maintain the solids in suspension. The liquid containing suspended solids are then circulated by pump 5 from bottom portions of retaining tank 1 through conduit 3 to bottom portion 4 of comminuting means 2 at a rate of at least about 30 and preferably between 50 and 300 volumes of liquid containing solids in the comminuting means per hour. There, is the comminuting means 2, the solids in the liquid continuum are ground by action of the agitated grinding elements 12 as the liquid containing the solids are steadily passed upwardly through the comminuting means. At the upper portion of comminuting means 2, the liquid containing suspended solids is discharged from comminuting means 2 through retaining screen 13B is a substantially unrestricted flow and back to retaining tank 1 through conduit 9.

This circulation and grinding is simultaneously continued until the solids in the batch are reduced to the desired particle size. The batch is then removed from the system and a new batch provided for the next grinding operation. In certain embodiments, it may be appropriate to utilize yet a third retaining tank or chamber; in such an embodiment conducting means are provided as above described to sequentially circulate the dispersion from and between the tanks while passing the dispersion through the comminuting means in the same direction on passage between each tank.

The rate of grinding and the quality of the solids ground will depend directly on the flow rate of the liquid continuum containing solids through comminuting means 2. And the flow rate is regulated primarily by the pumping rate of pump 5. However, viscosity of the liquid containing solids and the density of the agitated grinding bed also affect the flow rate by the resistance developed. In this connection, it should be noted that the solids in the dispersion are typically 20 to 50 percent by volume and 40 to 65 percent by weight. As will be apparent to those skilled in the art, higher percentages are difficult to circulate at the required flow rates and lower percentages generally do not provide for efficient grinding. The density of the grinding element bed depends primarily on the percentage of the comminuting vessel volume occupied by the grinding elements as above described, and to a lesser extent, on the size, density and shape of the grinding elements and the speed of rotation of agitator 6 which is typically between 100 and 400 revolutions per minute.

Figure 2:
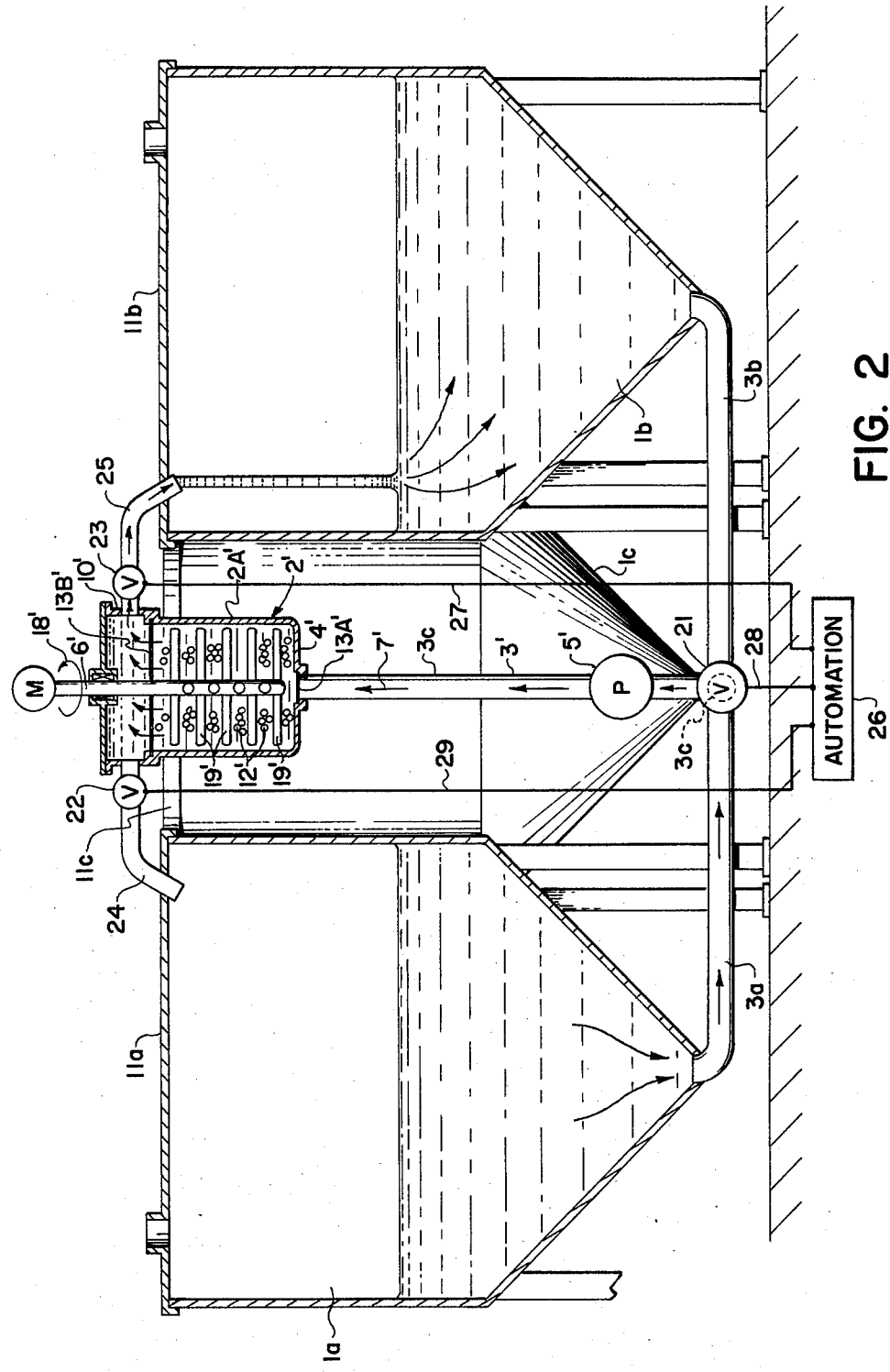
FIG. 2 is an elevational view in cross-section of an alternative grinding apparatus embodying the present invention wherein two separate retaining tanks are employed.

Referring to FIG. 2, an alternative embodiment of the invention is shown which optimizes the operation, but is more costly than the apparatus shown in FIG. 1. Specifically, this embodiment substantially reduces the probability that a given particle of solids remains in the retaining tank during a substantial part or all of the grinding cycle.

The apparatus of FIG. 2 comprises in addition a plurality of storage or retaining chambers or tanks such as 1a and 1b as shown. Conducting means as hereafter described, are also provided (a) to connect retaining tanks 1a and 1b and comminuting means 2' so liquid carrying solids to be ground is caused to flow from first retaining tank 1a through comminuting means 2' into second retaining tank 1b until first retaining tank 1a is substantially emptied, and (b) thereafter on reversal of the flow, the liquid carrying solids is caused to flow from second retaining tank 1b through comminuting means 2' and back to first retaining tank 1a. This means permits alternatively emptying first retaining tank 1a and then second retaining tank 1b through comminuting means 2' while maintaining the direction of flow through the comminuting means itself. The direction of flow in comminuting means 2' is again generally upwardly along the axis of the shaft of agitator 6'.

Specifically, conduit 3' of the apparatus shown in FIG. 2 has branches 3a, 3b and 3c connected by a three-way valve 21 which is controllable to optionally permit flow from the lower portion of retaining tank 1a or from the lower portion of retaining tank 1b into the lower portion 4' of comminuting vessel 2A'. Means such as the valves 22 and 23 are provided for optionally conducting, as desired, flow from upper retaining portion 10' adjacent comminuting means 2' through conduits 24 or 25 into either tank 1a or tank 1b. Suitable electrical control means 26 is connected through leads 27, 28 and 29 to automatically control valves 23, 21 and 22, respectively. By this arrangement, control means 26 automatically opens three-way valve 21 to permit flow through conduits 3a and 3c to comminuting means 2' and automatically closes and opens valves 22 and 23, respectively, to permit flow through conduit 25 from the comminuting vessel to retaining tank 1b. When retaining tank 1a is emptied, control means 26 then automatically changes three-way valve 21, opens valve 22 and closes valve 23 to permit flow through conduit 3b and 3c to bottom portions 4' of comminuting means 2' and then from comminuting means 2' through conduit 24 back to storage tank 1a. Fluid flow through the comminuting means back and forth from one tank to the other is automatically continued until the desired particle size distribution is obtained. In certain embodiments, it may be appropriate to utilize yet a third retaining tank or chamber 1c; in such an embodiment, conducting means 3c are provided as above described to sequentially conduct the dispersion from and between the tanks while passing the dispersion through the comminuting means in the same direction on passage between each tank.

It would be expected that the grinding efficiency or speed of grinding of the entire mass of material in the above system would depend primarily on the relative volumes of the comminuting means and storage chambers. It has been found, however, that the efficiency or speed of grinding of the whole mass of material depends not only on how much time a given portion of the material spends in comminuting means 2', but on how frequently and how fast that that portion will pass through comminuting means 2'.

More specifically stated, if a given comminuting means 2 or 2' has a volume 1/N times the volume N of the storage or retaining tank 1 or 1a, and the time required for grinding one comminuting vessel volume of material to a given particle size in the previous way shown in U.S. Pat. No. 2,764,359 (i.e. without circulation through a storage tank) is $t$, it has been found that instead of requiring a time $N \times t$, the grinding time is much less. How much less in time is determined primarily by the number of gallons or units of liquid containing solids pumped by pump 5 or 5' through comminuting means 2 or 2' in a given time. This flow rate has been designated by the term "streaming speed". The higher the streaming speed in a system of given volume the higher the frequency that any given part of the material passes through comminuting means 2 or 2' and the faster the entire mass is ground to a given particle size. The limiting factor is that streaming speed be greater than at least 30 volumes of liquid continuum containing solids in the comminuting means per hour.

Since the grinding efficiency in the present invention is dependent on flow rate through the comminuting means, it follows that the retaining tank or chamber may be small, and may be integral with either the pump means or the comminuting means, or both. Indeed, a retaining tank or portion may be minimized to that at the outlet of the comminuting means, such as shown by upper retaining portion 10 and 10' in FIGS. 1 and 2; and the flow rate necessary to the invention may be accomplished simply by circulating the liquid containing suspended solids from one end portion of the comminuting means, through the pump means and back to an end portion of the comminuting means substantially opposite the exiting end portion.

Figure 3:
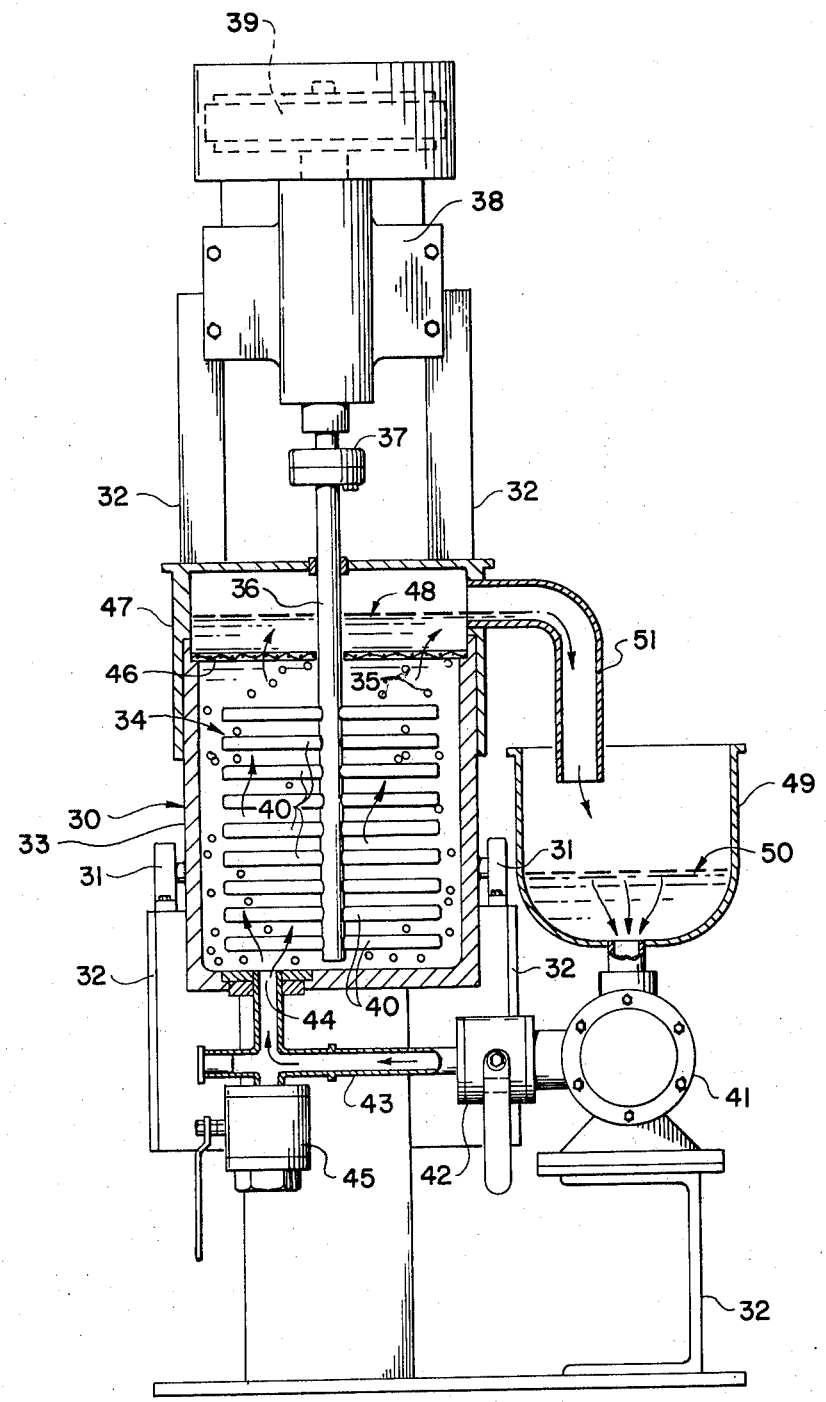
FIG. 3 is an elevational view in cross-section of a second alternative grinding apparatus embodying the present invention wherein retaining chambers integral with the pump means and the comminuting means are employed.

Referring to FIG. 3, apparatus embodying the present invention is shown wherein the only retaining chambers or tanks are provided integral with the pump means and the comminuting means. Agitated-media comminuting means 30 is pivotally mounted by trunnions 31 on frame 32. Comminuting means 30 is comprised of comminuting vessel 33 in which agitator 34 and comminuting or grinding elements 35 are disposed. Agitator 34 has a vertical shaft 36 centrally located in vessel 33 and cantilever supported through connection 34 by bearing means 38. Shaft 36 is also rigidly connected adjacent bearing means 38 to pulley means 39 which is driven by an electric motor or other suitable power means (not shown), to in turn drive shaft 36. Both bearing means 38 and the electric motor are supported via suitable mounts on frame 32. Agitator 34 also has a plurality of arms 40 projecting horizontally outwardly from shaft 36 in different directions to provide agitation for grinding elements 35.

Mounted on frame 32 adjacent comminuting means 30 is pump means 41. Pump means 41 discharges through valve means 42 into conduit means 43 which in turn discharges through inlet 44 into comminuting vessel 33 at the bottom thereof. Inlet 44 is positioned off-center and arms 40 of agitator 34 are positioned adjacent to maintain the solids in the liquid and avoid sedimentation at the bottom of vessel 33. Valve means 45 is also provided in conduit means 43 adjacent inlet 44 to provide, along with valve means 42, for discharge and drainage of the liquid slurry from the system.

Fastened to the top of comminuting vessel 33 is a retaining screen 46 and extension 47 to provide a retaining chamber 48. Retaining screen 46 retains the comminuting elements 35 during agitation and grinding, while leaving the liquid containing solids to freely discharge from comminuting means 30 below retaining screen 46 to retaining chamber 48 above retaining screen 46. Also fastened to the top of pump means 41 is a funnel-type inlet tank 49 which provides a retaining chamber 50 which may minimize the amount of retained liquid slurry. The liquid containing solids flows from extension 47 on vessel 33, i.e. retaining portion 48, to inlet tank 49, i.e. retaining portion 50, by conduit means 51.

In operation, pump means 41 circulates liquid containing suspended particulate solids, charged to the apparatus, through conduit means 43 and into comminuting means 30 at a rate of at least 30 and preferably between 50 and 300 volumes of liquid containing solids in the comminuting means per hour. The liquid containing solids pass upwardly through the comminuting vessel 33 and retaining screen 46 at the same flow rate and are therein ground by the agitation action of comminuting elements 35. The liquid containing solids are thus discharged into retaining portion 48 from where the slurry is discharged via conduit means 51 to retaining chamber 49 and pump means 41 for recirculation to comminuting means 30 by pump means 41.

This embodiment cannot process as much slurry in one batch as the apparatus shown in FIGS. 1 and 2. However, it has the advantage of being self-contained and less expensive. This embodiment thus makes available improved agitated-media processing in applications where the apparatus of FIGS. 1 and 2 would be impractical and, indeed, extends the use of agitated-media grinding into applications where it would otherwise be commercially unfeasible.

Figure 4:
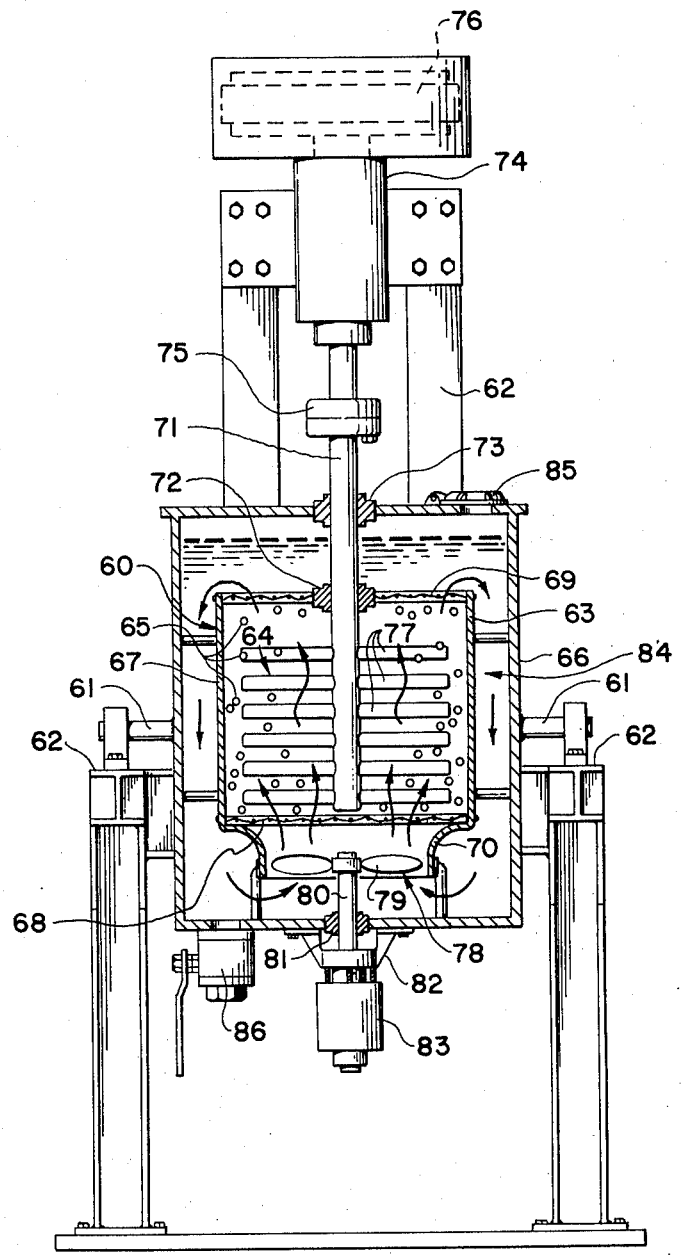
FIG. 4 is an elevational view in cross-section of a third alternative grinding apparatus employing the present invention wherein a retaining chamber and a pump means integral with the comminuting means are employed.

Referring to FIG. 4, apparatus embodying the present invention are shown wherein both the retaining chamber and pump means are integral with the comminuting means. Agitated-media comminuting means 60 is mounted by suitable bracketing to jacket vessel 66 which is in turn pivotally mounted by trunnions 61 on frame 62. Comminuting means 60 is comprised of comminuting vessel 63 in which agitator 64 and comminuting or grinding elements 65 are disposed. Circumscribing comminuting vessel 63 is an impervious cylindrical jacket vessel 66. The comminuting vessel has impervious cylindrical casing 67 and pervious or open end portions 68 and 69, which as shown are also retaining screens for comminuting means 60. Stated another way, retaining screens 68 and 69 retain the comminuting elements 65 during agitation and grinding, while permitting the liquid containing solids to flow through, and define the boundaries of comminuting means 60 and comminuting vessel 63 on the one hand, and retaining tank or portion 84 on the other.

Comminuting means 60 is completed by providing agitator 64 with agitator shaft 71 extending vertically downwardly through seals 72 and 73 in top portions of jacket vessel 66 and comminuting vessel 63. Shaft 71 extends from bearing means 74, from where the shaft is supported, through connection 75. Shaft 71 is also rigidly connected adjacent bearing means 74 to pulley means 76, which is in turn driven by an electric motor or the like (not shown). The electric motor and the bearing means 74 are both supported through suitable mounts on frame 62. Agitator 64 also has a plurality of arms 77 which project horizontally outwardly from shaft 71 in different directions to provide agitation for grinding elements 65.

Pump means 78 is provided in the assembly by mounting impeller 79 on pump shaft 80, preferably spaced within extension 70 from comminuting vessel 63. Extension 70 is shaped to provide the outer casing of pump means 78. Shaft 80 is mounted on bearing means 81 and extends upwardly through bearing means 81 and bottom portions of vessel 66 to support impeller 79. Shaft 80 is in turn connected to and driven directly, or through a gear train, by electric motor 83 which is supported via suitable mounts 82 by vessel 66.

The retaining chamber or portion 84 is provided in the space between comminuting vessel 63 and jacket vessel 66. The operation of the apparatus is thus commenced by charging a batch of liquid containing suspended solids to vessels 63 and 66 to fill them through inlet valve means 85 to a level above the end portion-retaining screen 69 of comminuting vessel 63. Comminuting means 60 and pump means 78 are then commenced to circulate the slurry from the retaining portion 84 through extension 70 to pump means 78 and from pump means 78 through retaining screen 68 into the comminuting means 60 at a rate of at least 30 and preferably between 50 and 300 volumes of liquid containing solids in the comminuting means (i.e. inner casing 67 bounded by end portions 68 and 69, with the agitator 64 and comminuting elements 65 present) per hour. In the comminuting means 60 the solids in the liquid are ground as the liquid containing solids are circulated upwardly through the comminuting vessel 63 and are discharged through end portion-retainer screen 69 back to the retaining tank or portion 84, from where the slurry is recirculated to the comminuting means 60. The recirculation is continued until the grinding is completed, when the operation is stopped and the slurry discharged through outlet valve means 86.

Figure 5:
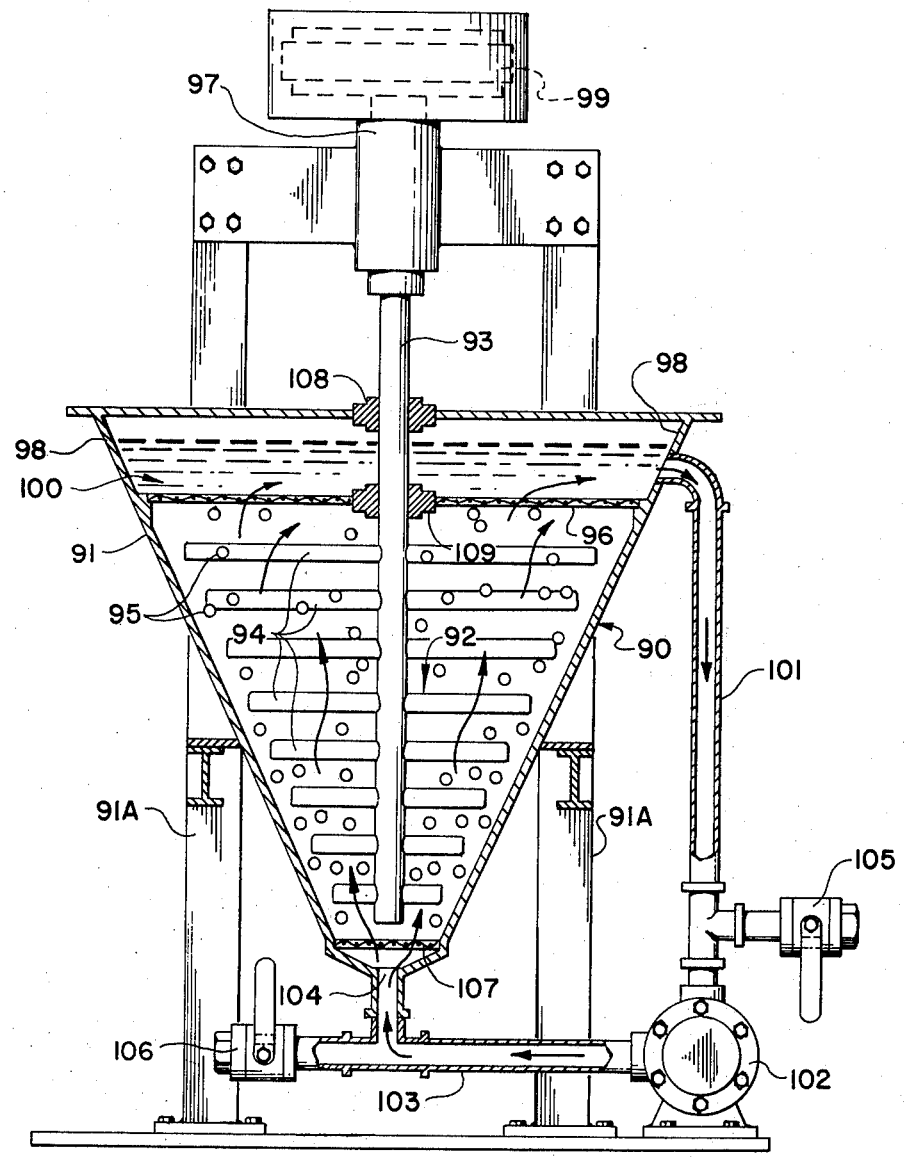
FIG. 5 is an elevational view in cross-section of a fourth alternative grinding apparatus employing the present invention wherein a retaining chamber integral with the comminuting means is employed.

Referring to FIG. 5, apparatus embodying the present invention is shown wherein the retaining tank or chamber is integral with the comminuting means, and the pump means is separate from the comminuting means. Agitated-media comminuting means 90 has comminuting vessel 91, which is funnel shaped, mounted on frame 91A. Disposed in vessel 91 is agitator 92 having a vertically mounted shaft 93 and a plurality of horizontally extending arms 94, which are of increasing length as they go up shaft 93 because of the shape of vessel 91. Shaft 93 is supported by bearing means 97 mounted on frame 91A and extends in cantilever fashion through seal 108 in top portion 98 and seal 109 in retaining screen 96. Retaining screen 96 is in turn mounted on and defines the top portion of comminuting vessel 91 and separates the comminuting means and retaining chamber 100. Shaft 93 is also rigidly connected, preferably through a bearing means 97 to a pulley means 99 which is in turn connected to a suitable electric motor or other power means. The arms 94 are rotated through comminuting or grinding elements 95 to agitate grinding elements 95 and cause grinding of the solids in the liquid circulated through the comminuting means 90.

The retaining chamber or portion 100 is provided integral with the comminuting means 90 by positioning retaining screen 96 spaced between extension 98 and comminuting vessel 91. The retaining screen retains the grinding elements 95 within the comminuting means 90 during agitation and grinding while permitting substantially unrestricted passage of the liquid containing suspended solids from the comminuting means into retaining chamber 100. Thus, comminuting means 90 is provided in comminuting vessel 91 below the retaining screen 96 and the retaining tank or portion 100 is provided in extension 98 above the retaining screen 96 with a minimum of retention volume.

High speed flow is provided in the comminuting means 90 in accordance with the present invention by pump means 102. The liquid containing solids circulate from retaining chamber 100 through conduit means 101 to pump means 102, and from pump means 102 through conduit means 103 to inlet 104 at the apex or bottom portion of comminuting vessel 91, where the liquid containing solids is discharged to comminuting means 90 through retaining screen 107. Pump means 102 thus circulates the liquid containing solids to and through the comminuting means 90 at a rate of at least 30 and preferably between 50 and 300 volumes of liquid containing solids in the comminuting means (i.e. in comminuting vessel 90 between retaining screens 96 and 107) per hour. The liquid containing solids is charged batchwise to the system through valve means 105 in conduit means 101 just ahead of pump means 102 and is discharged from the system through valve means 106 in conduit means adjacent inlet 104 to vessel 91.

Other details, objects and advantages of my invention will be apparent from the following non-limiting examples.

EXAMPLE I

A dispersion of particulate barite (i.e. barium sulphate) in mineral oil was formed where the barite was 70 percent by weight. The dispersion was then provided as four batches of 15 gallons each in a grinding apparatus, similar to that shown in FIG. 1, comprised of a 15-gallon separate retaining tank and a 2½ gallon agitated-ball comminuting means with a 1-gallon dispersion capacity, i.e. charged with ⅛ inch diameter steel ball grinding elements to a level of about 90 percent of the comminuting vessel in an unagitated state. The comminuting means, designated No. 1-S Attritor, is commercially available from Union Process, Inc., 1925 Akron Peninsula Road, Akron, Ohio.

The first 15-gallon batch was ground with a flow rate (i.e. streaming speed) of 5 gallons per hour. The second 15-gallon batch was ground with a flow rate (i.e. streaming speed) of 10 gallons per hour. The third 15-gallon batch was ground with a flow rate (i.e. streaming speed) of 80 gallons per hour. And the fourth 15-gallon batch was ground with a flow rate (i.e. streaming speed) of 177 gallons per hour. Similarly, a 1-gallon batch of the same dispersion was ground in the same agitated-ball mill with zero flow rate. During the grinding of each batch, samples were taken at various time increments and the particle size of the sample measured on the Hegman Scale. The accumulated data is shown in FIG. 6.

Figure 6:
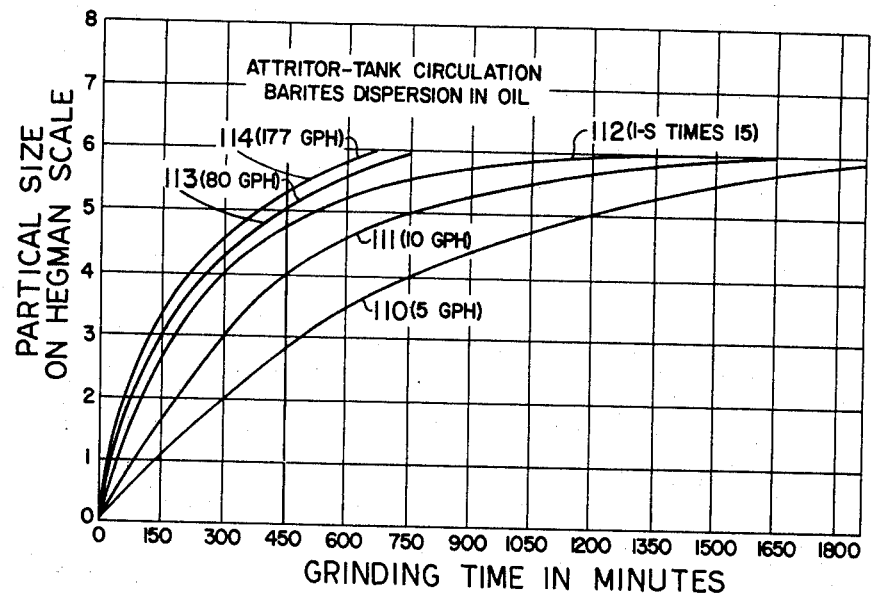
FIG. 6 is a graph showing the influence of the circulation rate through a comminuting means on the rate of reduction of particle size with apparatus with the present invention and the prior art.

Referring to FIG. 6:

Curve 110 shows the reduction in particle size as a function of grinding time where the flow rate was 5 gallons per hour;

Curve 111 shows the reduction in particle size as a function of grinding time where the flow rate was 10 gallons per hour;

Curve 112 shows the reduction in particle size as a function of grinding time multiplied by 15 where the flow rate was zero;

Curve 113 shows the reduction in particle size as a function of grinding time where the flow rate was 80 gallons per hour; and Curve 114 shows the reduction in particle size as a function of grinding time where the flow rate was 177 gallons per hour.

It is seen from the data shown in FIG. 6 that the higher the streaming speed, the greater is the efficiency and the shorter the time required to reach the desired fineness in the suspended solids. Prior to the present invention, streaming speeds through agitated-media mills fitted with a pump for circulation were zero to about 4 times the comminuting vessel per hour; this converts to a flow rate of up to about 13 volumes of liquid containing solids through the comminuting vessel per hour, see Examples, U.S. Pat. No. 3,149,789. To obtain a substantial increase in efficiency, the streaming speed should be at least 30 times the dispersion capacity volume in the comminuting means per hour. Higher speeds up to and greater than 300 times the dispersion capacity volume in the comminuting means per hour may be used, but for practical reasons speeds greater than 300 times the dispersion capacity volume in the comminuting means per hour are not preferred. Preferably, the vertical progress of the liquid passing through the comminuting means should be at least 2 mm per second and preferably 5 to about 50 mm per second. The frequency with which the volume of liquid in the system passes through the comminuting means is on the average more than 10 times per hour.

EXAMPLE II

A dispersion of sugar in mineral oil was formed wherein the sugar was 50 percent by weight. The dispersion was then provided in four batches of 15 gallons each. Three of the batches were processed in the same apparatus as used in Example I, similar to FIG. 1, with a 1-gallon dispersion capacity, i.e. ⅛ inch diameter steel ball grinding elements to a level of about 90 percent of the comminuting vessel in an unagitated state. The fourth batch was processed with a second 15-gallon separate retaining tank added to the apparatus, similar to the apparatus described in connection with FIG. 2.

The first 15-gallon batch was ground with a flow rate (i.e. streaming speed) of 10 gallons per hour. The second 15-gallon batch was ground with a flow rate of 20 gallons per hour. And the third 15-gallon batch was ground with a flow rate of 40 gallons per hour. The fourth 15-gallon batch processed with the two-tank apparatus as described in connection with FIG. 2 was ground with a flow rate of 40 gallons per hour. During each grinding operation samples were taken at time increments and the particle size of the solids measured with the Hegman Scale. The data compiled is shown in FIG. 7.

Figure 7:
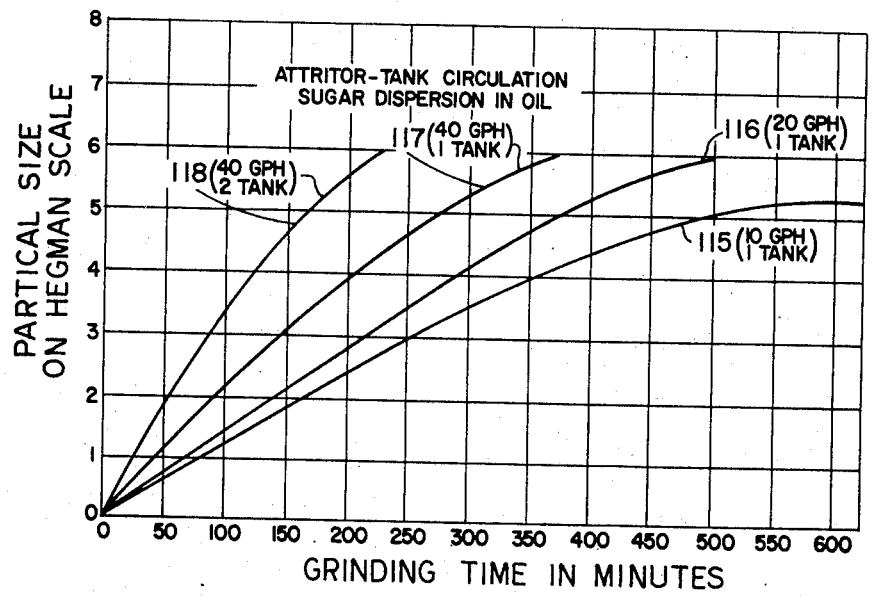
FIG. 7 is a second graph showing the effect of the circulation rate through a comminuting means and the rate of reduction of particle size with the present invention and the prior art.

Referring to FIG. 7:

Curve 115 shows the reduction in particle size as a function of grinding of the first batch where the flow rate was 10 gallons per hour;

Curve 116 shows the reduction in particle size as a function of grinding time of the second batch where the flow rate was 20 gallons per hour;

Curve 117 shows the reduction in particle size as a function of grinding time of the third batch where the flow rate was 40 gallons per hour; and Curve 118 shows the reduction in particle size as a function of grinding time of the fourth batch with the two-tank apparatus where the flow rate was 40 gallons per hour.

The data shown in FIG. 7 verifies the results of Example I. That is, the higher the streaming speed, the greater is the efficiency or the faster the particle size reaches the desired fineness. Comparing Curves 117 and 118, FIG. 7 shows the greater efficiency of the plural retaining tank apparatus and method as described in connection with FIG. 2.

EXAMPLE III

A dispersion of particulate barium ferrite in water was provided where the ferrite was 50 percent by weight. Heretofore such a dispersion was ground in a 2½-gallon 1-S Attritor agitated-media mill with grinding elements of ⅛ inch diameter steel balls and a 1-gallon dispersion capacity for a period of 4 hours to obtain satisfactory magnetic properties. Preparation of ferromagnetic material by such non-circulation procedure has been common.

Based on this experience, similar dispersions of 50 percent by weight barium ferrite in water were circulation ground in the same apparatus as used in Example I. The total volume of dispersion processed in this circulation grind was 14 gallons, and the flow rate (i.e. streaming speed) was 180 gallons per hour. The expected grinding time for the dispersion with such apparatus based on the prior experience was 56 hours (i.e. 4 hours multiplied by 14 gallons/1 gallon).

Samples were taken from the dispersion during the grind at 38½ percent (21.56 hours), 58 percent (32.48 hours), 73 percent (40.88 hours), 83 percent (46.48 hours), 90 percent (50.4 hours), and 95 percent (53.2 hours) of the calculated grinding time (56 hours). The ferrite samples were then measured for the coercive or negative magnetizing force required to return the magnetic field to zero (considered a measure of the number of magnetizable particles) (called the "H-C" measurement), for the coercive or negative magnetizing force required to return a magnetic field to zero and to maintain it at zero after the magnetizing force is removed (called the "$HC_1$" measurement), and for the maximum magnetic field times magnetic intensity (i.e. "BH"). The max BH is determined from the histerisis curve and indicates the total energy of the magnetic field and the magnetic permeability of the ferrite material. The samples were also measured for particle size with the Fisher Subsieve.

Figure 8:
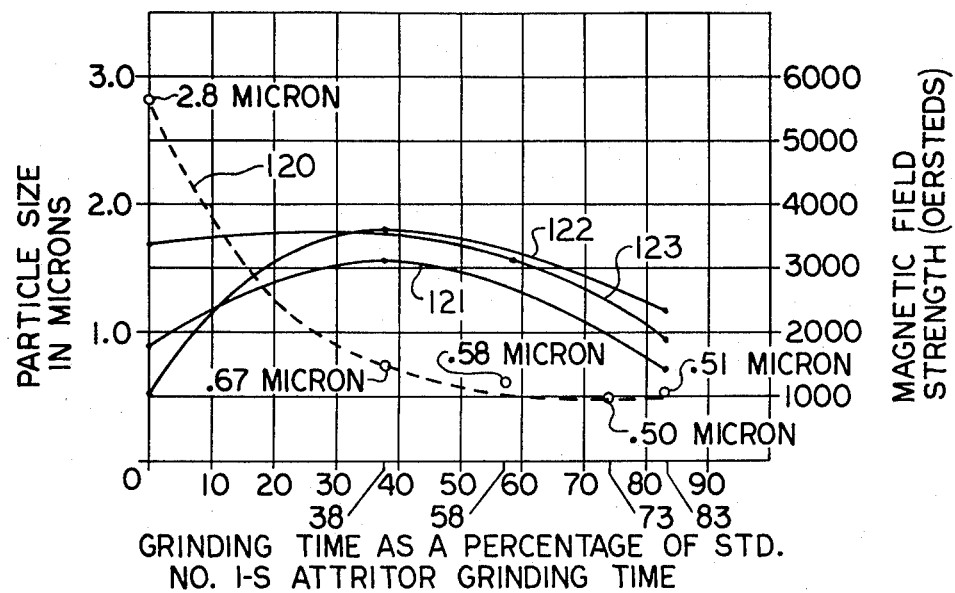
FIG. 8 is a graph showing the particle size and magnetic field strength as a function of grinding time of a particulate ferromagnetic material.

The accumulated data is shown in FIG. 8:

Curve 120 shows the reduction in particle size as a function of grinding time;

Curve 121 shows the relative change in the HC measurements with grinding time;

Curve 122 shows the relative change in $HC_1$ measurements with grinding time; and Curve 123 shows the relative change in max BH measurements with grinding time.

From the data as shown in FIG. 8, a maximum in the magnetic properties is found at a particle size of 0.67 microns after only 38 percent of the calculated expected grinding time. The reason for reaching an optimum in the magnetic properties after such a short grinding time is not fully known. It is believed, however, from the reasoning established by the data of Example IV that the particle size distribution of the particulate solid is made more uniform, in turn reducing the percentage of very fine particles which are not conductive for magnetic properties.

EXAMPLE IV

A dispersion of particulate barium ferrite in water was again provided where the ferrite was 50 percent by weight. A batch of such dispersion was processed (i.e. without circulation) in a 2½-gallon 1-S Attritor agitated media mill with ⅛ inch diameter steel ball grinding elements and a 1-gallon dispersion capacity in accordance with the prior art noncirculation-batch method. Samples were taken at various time increments during the grind to determine the optimum grinding time needed to obtain best magnetic properties in the same manner as described in Example III.

A 14-gallon batch of the same dispersion was then circulation ground in accordance with the present invention. The same apparatus was used as in Example I, similar to FIG. 1, with a 1-gallon dispersion capacity, i.e. again ⅛ inch diameter steel ball grinding elements filled to a level of about 90 percent of the volume of the comminuting vessel. The flow rate (i.e. streaming speed) was 180 gallons per hour. As described in connection with Example III, samples were taken at various time increments and the particle size and magnetic properties measured as in Example III.

A summary of the results of the measurements are shown in Table I:

Table I

| Grinding Time (hours) (% of calculated expected grinding time of 56 hours) | Particle Size (Fisher Subsieve) |
|---|---|
| 0 (0) | 1.82μ |
| 12.3 (22%) | 1.12μ |
| 21.8 (39%) | 1.05μ |
| 31.4 (56%) | 0.93μ |
| 46.5 (83%) | 0.83μ |
| 56.0 (100%) | 0.78μ |

The best magnetic properties were obtained at about 31.4 hours, i.e. 56 percent of the calculated grinding time of 56 hours (i.e. 4 hours × 14 gallons/1 gallon), where the particle size was 0.93 microns. This is much larger than the optimum particle size of 0.75 microns determined with conventional grinding techniques. As with Example III, it is again concluded that the particle size of the particulate ferromagnetic material made with the present invention was more uniform and the percentage of fine particles which are not magnetically conductive is reduced.

EXAMPLE V

Particulate paint pigment suitable for a nitro-cellulose based body primer was prepared as a dispersion in a system of nitro-cellulose and acrylate dissolved in ketone and alcohol. The pigment was approximately 35 percent by weight of the dispersion.

For comparison, a batch of the dispersion of particulate pigment was ground by prior techniques in a 1-S Attritor agitated-media mill of 1-gallon capacity with 3/16 inch diameter steel balls. A fineness of 4¾ on the Hegman Scale was obtained after 4 hours of grinding.

A 54-gallon batch of the dispersion of particulate pigment was then ground using circulation grinding apparatus of the present invention. The grinding apparatus was a Q-6 Attritor similar to that shown in FIG. 1, with a 4-gallon dispersion capacity, i.e. grinding elements of 3/16 inch diameter steel balls filled to a level of about 90 percent of the volume of the comminuting vessel (available at Union Process, Inc., 1925 Akron Peninsula Road, Akron, Ohio). The separate retaining tank was of approximately 56-gallon capacity, and the flow rate was 600 gallons per hour and the streaming speed was 150 volumes per hour $$\left(\text{i.e. } \frac{600 \text{ gallons/hour}}{4 \text{ gallon capacity}}\right).$$

The same fineness, 4¾ Hegman Scale, was obtained in 30.2 hours, i.e. 56 percent of the projected grinding time (54 hours = 4 hours × 54 gallons/4 gallons).

Figure 9:
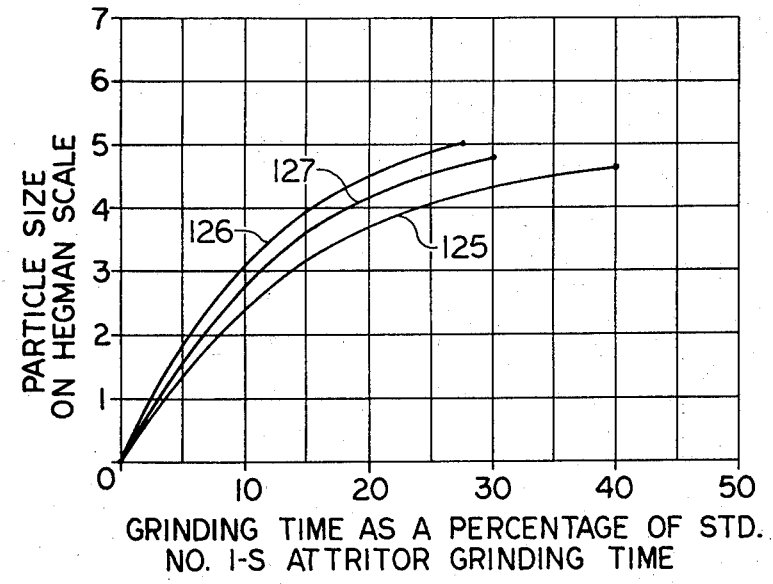
FIG. 9 is a graph showing a comparison of the rate of reduction of particle size of a paint pigment with the present invention and with the prior art.

Samples were also taken during the circulation grinding operations at various increments of time (as shown in FIG. 9). The particle size of the various samples were then measured on the Hegman Scale and the data plotted on FIG. 9.

Referring to FIG. 9:

Curve 125 shows the particle size as a function of grinding time for the comparative grinding operation;

Curve 126 shows the particle size as a function of grinding time for the circulation grinding operation; and Curve 127 shows the mathematical extrapolation of Curve 125 for an increased grinding rate of 25 percent.

From FIG. 9 it is seen that the fineness versus grinding time curves were considerably different. The curve 126 for the circulation grind increased at a much steeper slope than curve 125 as can be better seen by comparison of curves 126 and 127, which is a positive indication that the large solid particles of the dispersion were being ground at a faster rate than the smaller particles. It is concluded therefrom that grinding in accord with the present invention results in a more uniform distribution of particle size than the comparative, prior art grinding techniques.

EXAMPLE VI

Particulate iron oxide suitable for a transparent oxide coating for use in automobile finishing was prepared as a dispersion in an acrylic resin dissolved in toluene and ketone. The oxide was about 20 percent by weight of the dispersion.

In order to obtain proper transparency of the oxide in the coating, the light diffraction caused by the larger particles must be reduced to a minimum. This means that almost every particle present which is larger than 0.25 microns must be removed.

A one-gallon batch of the dispersion of particulate iron oxide was ground by prior techniques (i.e. without circulation) in a 2½-gallon 1-S Attritor agitated-media mill with a 1-gallon dispersion capacity and grinding elements of ⅛ inch diameter steel balls. The proper transparency was obtained in 4 hours of processing. It should be noted that the same transparency has been usually obtained in the convention steel ball mill only after 65 to 72 hours of grinding.

A 54-gallon batch of the dispersion of particulate iron oxide was then ground using circulation apparatus of the present invention. The processing was again done in the Q-6 Attritor agitated-media mill as described in Example V, similar to the apparatus shown in FIG. 1. The retaining tank was of 56-gallon capacity, and the flow rate through the comminuting vessel was again 600 gallons per hour and the corresponding streaming speed was 150 volumes per hour.

In the circulation grind, the proper transparency was achieved after 27½ hours of grinding. From the above comparative grind, one would expect a grinding time of 54 hours, i.e. 4 hours × 54 gallons/4 gallons. Thus, it is seen that the present invention required only about 51 percent of the previously expected grinding time with a savings of about 49 percent in grinding time.

EXAMPLE VII

Particulate yellow iron oxide suitable for a transparent oxide coating for use in automobile finishing was prepared as a dispersion in a mixture of acrylic solution. The oxide was about 30 percent by weight of the dispersion.

Batches were then ground (i) in a 1-S Attritor agitated-media mill of 1½-gallon dispersion capacity with 3/16 inch diameter steel balls in accordance with prior noncirculation batch practices, and (ii) in a QA-1 Attritor agitated-media mill of ½-gallon dispersion capacity with 3/16 inch diameter steel balls filled to a level of about 90 percent of the comminuting vessel in accordance with the present invention. The QA-1 Attritor mill is an embodiment similar to that described in FIG. 3 with a 2-gallon dispersion capacity or charge to the system. The QA-1 Attritor mill is available at Union Process, Inc., 1925 Akron Peninsula Road, Akron, Ohio. The pump rate was 22 gallons per hour and the streaming speed was 44 volumes per hour.

A 1½-gallon batch was charged to the 1-S Attritor mill and a 2-gallon batch was charged to the QA-1 Attritor mill. The batches were then ground until proper transparency for use as a paint finish was achieved, with samples taken periodically from both batches and the particle size measured on the Hegman Scale. The results of the grinds are shown in Table II.

TABLE II

| Grind Time in Minutes | Hegman Measure on 1-S Grind | Hegman Measure on QA-1 Grind |
|---|---|---|
| 0 | 3 | 3 |
| 5 | — | 5½+ |
| 10 | — | 6¼+ |
| 15 | 5– | 6¾+ |
| 20 | — | 7¼+ |
| 30 | — | — |
| 45 | 6⅔– | — |
| 60 | — | — |
| 75 | 6¾ | Full Transparency (Grind Stopped) |
| 420 | Full Transparency (Grind Stopped) | — |

Table II shows a dramatic reduction in the grinding time with the present invention. It took 5.6 times longer to reach full transparency with the prior art practice than with the present invention. And the Hegman Measurements show that there was, for example, a greater reduction in particle size with the QA-1 grind in 10 minutes than there was in the 1-S grind in 45 minutes.

EXAMPLE VIII

A dispersion of sugar was prepared in mineral oil and lecithin in which the solids were 50 percent by weight.

Comparative grinds were again performed in the same apparatus, the 1-S Attritor agitated-media mill and the QA-1 Attritor agitated-media mill as used in Example VII. A 1½-gallon batch was charged to the 1-S grinder, and a 2-gallon batch was charged to the QA-1 grinder. The pump rate with the circulation grind, i.e. the QA-1 grind, was 22 gallons per hour and the streaming speed was 44 volumes per hour.

The batches were ground for various periods of time with samples taken at various times and the particle size measured on the Hegman Scale. The results of the grinds are shown in Table III.

TABLE III

| Grind Time in Minutes | Hegman Measure on 1-S Grind | Hegman Measure on QA-1 Grind |
|---|---|---|
| 0 | 0 | 0 |
| 2½ | — | 3½ |
| 5 | — | 4¾ |
| 7½ | — | 5½ |
| 10 | 1½ | — |
| 20 | 3½ | — |
| 30 | 4½ | — |
| 40 | 4¾ | — |

Table III again dramatically illustrates the increased grinding efficiency of the present invention. The QA-1 grind reached a particle size of 4¾ in 5 minutes; ⅛ the time required to reach the same particle size in the 1-S grind.

The reason for the surprising result of the present invention is not entirely understood. One explanation is that the relatively high streaming speed results in laminar flow through the comminuting means, which results in the substantial reduction in turbulence and recirculation of the liquid containing solids within the comminuting means. If such is so, the whole batch of liquid containing solids is convectively circulated through the comminuting means and processed as if the batch was totally within the comminuting means.

The more plausible explanation, however, seems to be that of a "dynamic sieve". This explanation can best be illustrated by reference to FIG. 10. The retaining screens 13A and 13B, respectively, of the comminuting means 2 are shown. In between is shown grinding elements 12 in an agitated condition, with the screens restricting the movement and maintaining the density of the grinding elements. For purposes of illustration, the paths of a large particle 130 and a small particle 131 through the agitated grinding elements are shown by arrows 132 and 133, respectively.

Figure 10:
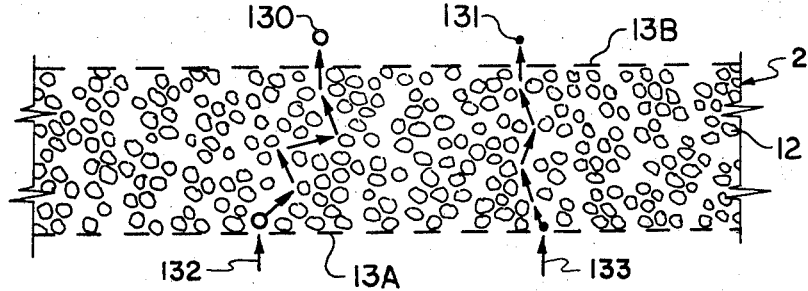
FIG. 10 is a schematic illustration of a proposed theory of operation of the present invention.

As shown by FIG. 10, the interstices between the agitated grinding elements 12 act as a constantly changing kinetic sieve. The large particle 130 has a higher probability of collisions with the grinding elements 12 than the small particle 131 and thus travels a longer path through the bed of agitated grinding elements 12 than the smaller particle 131. The grinding time for the larger particles is in turn larger than the grinding time for the smaller particles. The larger particles are therefore ground at a higher rate than the smaller particles.

It should be emphasized that this is only one explanation. It may be that the proper explanation is a combination of the laminar flow and the dynamic sieve explanations. Irrespective of the theory, however, it remains that the present invention gives totally unexpected results than what was heretofore logically projected from a knowledge of the art.

Summarily, the specific advantages of the invention are as follows: (1) the size of comminuting means is made independent of the size of the batch desired to be ground while avoiding the slow grinding rates and mechanical difficulties associated with continuous agitated-media mills (e.g. see U.S. Pat. No. 3,149,789). (2) The grinding speed of a given size batch of a given particulate is substantially increased particularly facilitating the grinding of particulates previously difficult to grind. (3) The particle size distribution of the resulting product is more uniform at least in certain instances to produce superior products. (4) And certain materials can be readily added and dispersed during the grinding operation so that (i) grinding and dispersing can be accomplished more rapidly, (ii) materials which are degraded with too much grinding, e.g. bentonite, can be ground and dispersed into the formulation during the latter part of the processing cycle, and (iii) components, e.g. latex-type material, which readily flocculate by mechanical action can be added into the formulation during the latter part of the processing cycle. This last advantage includes the ability to add components consecutively and slowly so that flocculation conditions are avoided by time of the addition of the material.

Further, the sum total of these advantages provides for ease in "building up of a formulation" which is very advantageous in certain applications. For example, the making of universal colorants requires obtaining the ultimate fineness of color while preparing a complicated formulation (including conditioners and miscible solvents) that can be mixed into an aqueous system, a hydrocarbon system or a lacquer system. Another example is water-borne paints which include large amounts of extenders to control leveling and binders that can prematurely flocculate, and which require the addition of components without air absorption or foaming.

While presently preferred embodiments have been shown and described with particularity, it is distinctly understood that the invention may be otherwise variously performed and embodied within the scope of the following claims.

What is claimed is:

1. A method of grinding solids comprising the steps of:
    A. providing a batch of particulate solids to be ground suspended in a liquid continuum;
    B. repeatedly circulating the liquid continuum containing suspended solids sequentially through pump means and a comminuting means at a streaming speed of at least about 30 volumes of liquid continuum containing solids in the comminuting means per hour;
    C. grinding said solids in the comminuting means as the liquid continuum containing solids steadily passes through the comminuting means; and
    D. continuing steps B and C until the solids in the batch are reduced to desired particle size.

2. A method of grinding solids as set forth in claim 1 wherein:
    the liquid continuum containing solids is circulated through the pump means and comminuting means at a streaming speed between 50 and 300 volumes of liquid continuum containing solids in the comminuting means per hour.

3. A method of grinding solids comprising the steps of:
    A. providing a batch of particulate solids to be ground suspended in a liquid continuum;
    B. forming a comminuting means by establishing a bed of agitated grinding elements in a comminuting vessel;
    C. repeatedly circulating the liquid continuum containing suspended solids sequentially through pump means and the comminuting means at a streaming speed of at least about 30 volumes of liquid continuum containing solids in the comminuting means per hour;
    D. grinding said solids in the comminuting means as the liquid continuum steadily passes through the comminuting means; and
    E. continuing steps B through D until the solids in the batch are reduced to desired particle size.

4. A method of grinding solids as set forth in claim 3 vherein:
    the step of forming the comminuting means includes filling the comminuting vessel with grinding elements to a level such that less than about 15 percent of the volume of the comminuting vessel is free space apart from the grinding elements in the unagitated state.

5. A method of grinding solids as set forth in claim 4 wherein:
    the liquid continuum containing suspended solids is circulated through the pump means and comminuting means at a streaming speed between 50 and 300 volumes of liquid continuum containing solids in the comminuting means per hour.

6. A method of grinding solids as set forth in claim 3 wherein:
    step C is accomplished by passing the liquid continuum containing solids substantially upwardly through the bed of agitated grinding elements.

7. A method of grinding solids as set forth in claim 6 wherein:
    the vertical progress of the liquid continuum containing solids through the comminuting means is at least 2 mm per second.

8. A method of grinding solids as set forth in claim 7 wherein:
    the vertical progress is between 5 and 50 mm per second.

9. A method of grinding solids as set forth in claim 3 comprising in addition between steps C and D:
    discharging the liquid continuum containing solids from the comminuting means through a retaining screen in a substantially unrestricted flow.

10. A method of grinding solids as set forth in claim 9 wherein:
    the step of forming the comminuting means includes filling the comminuting vessel with grinding elements to a level such that less than about 15 percent of the volume of the comminuting vessel is free space apart from the grinding elements in the unagitated state.

11. A method of grinding solids as set forth in claim 10 wherein:
    the liquid continuum containing solids is circulated through the pump means and comminuting means at a streaming speed between 50 to 300 volumes of liquid continuum containing solids in the comminuting means per hour.

12. A method of grinding solids comprising the steps of:
    A. providing a batch of particulate solids to be ground suspended in a liquid continuum in a retaining chamber;
    B. circulating the liquid continuum containing solids from the retaining chamber into a comminuting means at one end thereof at a streaming speed of at least about 30 volumes of liquid continuum containing solids in the comminuting means per hour;
    C. grinding said solids in the comminuting means as the liquid continuum containing solids steadily passes through the comminuting means;
    D. discharging the liquid continuum containing suspended solids from the comminuting means at an end substantially opposite the circulation to the means into the retaining chamber at a streaming speed of at least about 30 volumes of liquid continuum containing solids in the comminuting means per hour; and
    E. simultaneously continuing steps B through D until the solids in the batch are reduced to desired particle size.

13. A method of grinding solids as set forth in claim 12 wherein:

the batch provided in the retaining chamber is circulated into the comminuting means at a streaming speed such that at least about 10 volumes of liquid continuum containing solids in the retaining chamber per hour pass through the comminuting means.

14. A method of grinding solids as set forth in claim 12 wherein:
the liquid continuum containing suspended solids is circulated to the comminuting means at a streaming speed between 50 and 300 volumes of liquid continuum containing solids in the comminuting means per hour.

15. A method of grinding solids comprising the steps of:
A. providing a batch of particulate solids to be ground suspended in a liquid continuum in a retaining chamber;
B. forming a comminuting means by establishing a bed of agitated grinding elements in a comminuting vessel;
C. circulating the liquid continuum containing suspended solids from the retaining chamber into the comminuting means at one end thereof at a streaming speed of at least about 30 volumes of liquid continuum containing solids in the comminuting means per hour;
D. grinding said solids in the comminuting means as the liquid continuum containing solids steadily passes through the comminuting means;
E. discharging the liquid continuum containing solids from the comminuting means at an end substantially opposite the circulation to the means into the retaining chamber at a streaming speed of at least about 30 volumes of liquid continuum containing solids in the comminuting means per hour; and
F. simultaneously continuing steps B through E until the solids in the batch are reduced to desired particle size.

16. A method of grinding solids as set forth in claim 15 wherein:
the step of forming the comminuting means includes filling the comminuting vessel with grinding elements to a level such that less than about 15 percent of the volume of the comminuting vessel is free space apart from the grinding elements in the unagitated state.

17. A method of grinding solids as set forth in claim 16 wherein:
the liquid continuum containing suspended solids is circulated to the comminuting means at a streaming speed between 50 to 300 volumes of liquid continuum containing suspended solids in the comminuting means per hour.

18. A method of grinding solids as set forth in claim 16 wherein:
step D is accomplished by passing the liquid continuum containing solids substantially upwardly through the bed of agitated grinding elements.

19. A method of grinding solids as set forth in claim 18 wherein:
the vertical progress of the liquid continuum containing solids through the comminuting means is at least 2 mm per second.

20. A method of grinding solids as set forth in claim 19 wherein:
the vertical progress is between 5 and 50 mm per second.

21. A method of grinding solids as set forth in claim 15 wherein:
the batch provided in the retaining chamber is circulated into the comminuting means at a streaming speed such that at least about 10 volumes of liquid continuum containing solids in the retaining chamber per hour pass through the comminuting means.

22. A method of grinding solids as set forth in claim 15 comprising in addition between steps C and D:
discharging the liquid continuum containing solids from the comminuting means through a retaining screen in a substantially unrestricted flow.

23. A method of grinding solids as set forth in claim 22 wherein:
the step of forming the comminuting means includes filling the comminuting vessel with grinding elements to a level such that less than about 15 percent of the volume of the comminuting vessel is free space apart from the grinding elements in the unagitated state.

24. A method of grinding solids as set forth in claim 22 wherein:
the liquid continuum containing solids is circulated through the pump means and comminuting means at a streaming speed between 50 to 300 volumes of liquid continuum containing solids in the comminuting means per hour.

25. A method of grinding solids comprising the steps of:
A. providing a batch of particulate solids to be ground suspended in a liquid continuum in a first retaining chamber;
B. circulating the liquid continuum containing suspended solids from the first retaining chamber into a comminuting means at one end thereof at a streaming speed of at least about 30 volumes of liquid continuum containing solids in the comminuting means per hour;
C. grinding said solids in the comminuting means as the circulated liquid continuum containing solids steadily passes through the comminuting means;
D. discharging the liquid continuum containing suspended solids from the comminuting means at an end substantially opposite the circulation to the comminuting means into a second retaining chamber at a streaming speed of at least about 30 volumes of liquid continuum containing solids in the comminuting means per hour until a batch is provided in the second retaining chamber;
E. thereafter recirculating the liquid continuum containing solids from the second retaining chamber into the comminuting means at one end thereof at a rate of at least about 30 volumes of the liquid continuum containing solids in the comminuting means per hour;
F. grinding said solids in the comminuting means as the recirculated liquid continuum steadily passes through the comminuting means;
G. discharging the liquid continuum containing solids from the comminuting means at an end substantially opposite the recirculation to the means into a third retaining chamber at a streaming speed of at least about 30 volumes of liquid continuum containing solids in the comminuting means per hour until a batch is provided in the third retaining chamber; and
H. repeating steps B through G until the solids in the batch are reduced to desired particle size.

26. A method of grinding solids as set forth in claim 25 wherein:
the third retaining chamber is the same tank as the first retaining chamber and step H is performed automatically.

27. A method of grinding solids as set forth in claim 26 wherein:
the batch provided in the first retaining chamber is circulated into the comminuting means at a streaming speed such that at least about 10 volumes of liquid continuum containing solids in the first retaining chamber per hour pass through the comminuting means.

28. A method of grinding solids as set forth in claim 27 wherein:
the liquid continuum containing suspended solids is circulated to the comminuting means at a streaming speed between 50 and 300 volumes of liquid continuum containing solids in the comminuting means per hour.

29. A method of grinding solids comprising the steps of:
A. providing a batch of particulate solids to be ground suspended in a liquid continuum in a first retaining chamber;
B. forming a comminuting means by establishing a bed of agitated grinding elements in a comminuting vessel;
C. circulating the liquid continuum containing suspended solids from the first retaining chamber into the comminuting means at one end thereof at a streaming speed of at least about 30 volumes of liquid continuum containing solids in the comminuting means per hour;
D. grinding said solids in the comminuting means as the circulated liquid continuum containing solids steadily passes through the comminuting means;
E. discharging the liquid continuum containing suspended solids from the comminuting means at an end substantially opposite the circulation to the comminuting means into a second retaining chamber at a streaming speed of at least about 30 volumes of liquid continuum containing solids in the comminuting means per hour until a batch is provided in the second retaining chamber;
F. thereafter recirculating the liquid continuum containing solids from the second retaining chamber into the comminuting means at one end thereof at a rate of at least about 30 volumes of the liquid continuum containing solids in the comminuting means per hour;
G. grinding said solids in the comminuting means as the recirculated liquid continuum steadily passes through the comminuting means;
H. discharging the liquid continuum containing solids from the comminuting means at an end substantially opposite the recirculation to the means into a third retaining chamber at a streaming speed of at least about 30 volumes of liquid continuum containing solids in the comminuting means per hour until a batch is provided in the third retaining chamber; and
I. repeating steps B through H until the solids in the batch are reduced to desired particle size.

30. A method of grinding solids as set forth in claim 29 wherein:
the step of forming the comminuting means includes filling the comminuting vessel with grinding elements to a level such that less than about 15 percent of the volume of the comminuting vessel is free space apart from the grinding elements in the unagitated state.

31. A method of grinding solids as set forth in claim 30 wherein:
the liquid continuum containing solids is circulated through the pump means and comminuting means at a streaming speed between 50 to 300 volumes of liquid continuum containing solids in the comminuting means per hour.

32. A method of grinding solids as set forth in claim 31 wherein:
steps D and G are accomplished by passing the liquid continuum containing solids substantially upwardly through the bed of agitated grinding elements.

33. A method of grinding solids as set forth in claim 29 wherein:
the third retaining chamber is the same tank as the first retaining chamber and step I is performed automatically.

34. A method of grinding solids as set forth in claim 33 wherein:
the first batch provided in the retaining chamber is circulated into the comminuting means at a streaming speed such that at least about 10 volumes of liquid continuum containing solids in the first retaining chamber per hour pass through the comminuting means.

35. A method of grinding solids as set forth in claim 28 wherein steps E and H include:
discharging the liquid continuum containing solids from the comminuting means through a retaining screen in a substantially unrestricted flow.

36. A method of grinding solids as set forth in claim 35 wherein:
the step of forming the comminuting means includes filling the comminuting vessel with grinding elements to a level such that less than about 15 percent of the volume of the comminuting vessel is free space apart from the grinding elements in the unagitated state.

37. A method of grinding solids as set forth in claim 36 wherein:
the liquid continuum containing solids is circulated through the pump means and comminuting means at a streaming speed between 50 to 300 volumes of liquid continuum containing solids in the comminuting means per hour.

38. A method of grinding solids as set forth in claim 36 wherein:
steps D and G are accomplished by passing the liquid continuum containing solids substantially upwardly through a bed of agitated grinding elements.

39. Apparatus for comminuting particulate solids contained in a liquid continuum comprising:
A. an agitated-media comminuting means having (1) a substantially cylindrical comminuting vessel with an axial axis, (2) a rotatable agitator with a shaft disposed substantially along said axis and with protuberances extending outwardly from said axis to near cylindrical walls of said comminuting vessel, (3) a mass of grinding elements disposed in said comminuting vessel to overlie at least some of said protuberances, (4) means for rotating said agitator to cause said mass of grinding elements to have an increased apparent volume, and (5) inlet and outlet openings for respectively permitting liquid carrying particulate solids to be ground to enter said comminuting vessel, pass through said agitated grinding elements, and thereafter exit said comminuting vessel;

B. pump means for causing repeated flow of at least 30 volumes of liquid containing particulate solids in the comminuting means per hour successively through said comminuting means; and C. conducting means for circulating the liquid containing particulate solids from one end portion of the comminuting vessel through the pump means and back to end portions of the comminuting vessel substantially opposite the end portion where the liquid containing particulate solids exited the comminuting vessel.

40. Apparatus for comminuting particulate solids contained in a liquid continuum as set forth in claim 39 comprising in addition:

D. at least one retaining chamber for retention of and passage of liquid containing particulate solids therethrough by the conducting means from the comminuting means and to the pump means.

41. Apparatus for comminuting particulate solids contained in a liquid continuum as set forth in claim 40 wherein:

the retaining chamber is integral with the comminuting means.

42. Apparatus for comminuting particulate solids contained in a liquid continuum as set forth in claim 40 wherein:

the retaining chamber is integral with the pump means.

43. Apparatus for comminuting particulate solids contained in a liquid continuum as set forth in claim 40 wherein:

the retaining chamber and the pump means are integral with the comminuting means.

44. Apparatus for comminuting particulate solids contained in a liquid continuum as set forth in claim 39 wherein:

the mass of grinding elements disposed in said comminuting vessel to a level such that less than about 15 percent of the volume of the comminuting vessel is free space apart from the grinding elements in an unagitated state.

45. Apparatus for comminuting particulate solids contained in a liquid continuum as set forth in claim 39 wherein:

the outlet opening of the comminuting means comprises a retaining screen to provide substantially unrestricted flow from the comminuting vessel.

46. Apparatus for comminuting particulate solids contained in a liquid continuum as set forth in claim 45 wherein:

the mass of grinding elements disposed in said comminuting vessel to a level such that less than about 15 percent of the volume of the comminuting vessel is free space apart from the grinding elements in an unagitated state.

47. Apparatus as set forth in claim 39 comprising in addition:

D. first and second retaining chambers, and conducting means for connecting said retaining tanks with said comminuting means and pump means for causing the liquid containing solids to be ground to flow from a first retaining chamber through the comminuting means into a second retaining chamber, and alternatively for causing the liquid containing solids to flow from said second retaining chamber through the comminuting means back into the first retaining chamber.

48. Apparatus for comminuting particulate solids contained in a liquid continuum comprising:

A. an agitated-media comminuting means having (1) a substantially cylindrical comminuting vessel with an axial axis, (2) a rotatable agitator with a shaft disposed substantially along said axis and with protuberances extending outwardly from said axis to near cylindrical walls of said comminuting vessel, (3) a mass of grinding elements disposed in said comminuting vessel to overlie at least some of said protuberances, (4) means for rotating said agitator to cause said mass of grinding elements to have an increased apparent volume, and (5) inlet and outlet openings for respectively permitting liquid carrying particulate solids to be ground to enter said comminuting vessel, pass through said agitated grinding elements, and thereafter exit said comminuting vessel;

B. a retaining portion integral with the comminuting vessel adjacent the comminuting means separated from the comminuting means by a retaining screen for retaining the grinding elements while permitting passage of the liquid containing particulate solids from the comminuting means into the retaining portion;

C. pump means for causing repeated flow of at least 30 volumes of liquid containing particulate solids in the comminuting means per hour successively through said comminuting means; and D. conducting means for circulating the liquid containing particulate solids from one end portion of the comminuting vessel through the pump means and back to end portions of the comminuting vessel substantially opposite the end portion where the liquid containing particulate solids exited the comminuting vessel.

49. Apparatus for comminuting particulate solids contained in a liquid continuum as set forth in claim 48 comprising in addition:

E. at least one retaining chamber for retention of and passage of liquid containing particulate solids therethrough by the conducting means from the comminuting means and to the pump means.

50. Apparatus as set forth in claim 49 comprising in addition:

D. first and second retaining chambers, and conducting means for connecting said retaining tanks with said comminuting means and pump means for causing the liquid containing solids to be ground to flow from a first retaining chamber through the comminuting means into a second retaining chamber, and alternatively for causing the liquid containing solids to flow from said second retaining chamber through the comminuting means back into the first retaining chamber.

51. Apparatus for comminuting particulate solids contained in a liquid continuum as set forth in claim 48 wherein:

the mass of grinding elements disposed in said comminuting vessel to a level such that less than about 15 percent of the volume of the comminuting vessel is free space apart from the grinding elements in an unagitated state.

52. A particulate solid material having relatively small particle size and substantial particle size uniformity prepared by:
   A. providing a batch of particulate solids to be produced suspended in a liquid continuum;
   B. circulating the liquid continuum containing suspended solids repeatedly through a comminuting means at a streaming speed of at least about 30 volumes of liquid continuum containing solids in the comminuting means per hour;
   C. grinding said solids in the comminuting means by passing the liquid continuum containing solids through a bed of agitated grinding elements as the liquid continuum containing solids steadily flows through the comminuting means; and
   D. simultaneously continuing steps B and C until the solids in the batch are reduced to desired particle size.

53. A particulate material having substantially greater particle size uniformity prepared by:
   A. providing a batch of particulate solids to be produced suspended in a liquid continuum in a first retaining chamber;
   B. circulating the liquid continuum containing suspended solids from the first retaining chamber into a comminuting means at one end thereof at a streaming speed of at least about 30 volumes of liquid continuum containing solids in the comminuting means per hour;
   C. grinding said solids in the comminuting means by passing the liquid continuum containing solids through a bed of agitated grinding elements as the circulated liquid continuum steadily flows through the comminuting means;
   D. discharging the liquid continuum containing solids from the comminuting means at an end substantially opposite the circulation to the means into a second retaining chamber at a streaming speed of at least about 30 volumes of liquid continuum containing solids in the comminuting means per hour until a batch is provided in the second retaining chamber;
   E. thereafter recirculating the liquid continuum containing suspended solids from the second retaining chamber into the comminuting means at one end thereof at a rate of at least about 30 volumes of the liquid continuum containing solids in the comminuting means per hour;
   F. grinding said solids in the comminuting means as in step C as the recirculated liquid continuum steadily flows through the comminuting means;
   G. discharging the liquid continuum containing solids from the comminuting means at an end substantially opposite the recirculation to the comminuting means into the first retaining chamber at a streaming speed of at least about 30 volumes of liquid continuum containing solids in the comminuting means per hour until a batch is again provided in the first retaining chamber; and
   H. repeating steps B through G until the solids in the batch are reduced to desired particle size.

54. A particulate ferromagnetic material having increased magnetic capabilities prepared by:
   A. providing a batch of particulate solids to be produced suspended in a liquid continuum in a retaining chamber;
   B. circulating the liquid continuum containing suspended solids repeatedly through a comminuting means at a streaming speed of at least about 30 volumes of liquid continuum containing solids in the comminuting means per hour;
   C. grinding said solids in the comminuting means by passing the liquid continuum containing solids through a bed of agitated grinding elements as the liquid continuum containing solids steadily flows through the comminuting means; and
   D. simultaneously continuing steps B through C until the solids in the batch are reduced to desired particle size.

55. A particulate ferromagnetic material having increased magnetic capabilities as set forth in claim 54 wherein:
   the ferromagnetic material is a barium ferrite.

56. A particulate ferromagnetic material having increased magnetic capabilities prepared by:
   A. providing a batch of particulate solids to be produced suspended in a liquid continuum in a first retaining tank;
   B. circulating the liquid continuum containing suspended solids from the first retaining chamber into a comminuting means at one end thereof at a streaming speed of at least about 30 volumes of liquid continuum containing solids in the comminuting means per hour;
   C. grinding said solids in the comminuting means by passing the liquid continuum containing solids through a bed of agitated grinding elements as the circulated liquid continuum steadily passes through the comminuting means;
   D. discharging the liquid continuum containing solids from the comminuting means at an end substantially opposite the circulation to the comminuting means into a second retaining chamber at a streaming speed of at least about 30 volumes of liquid continuum containing solids in the comminuting means per hour until a batch is provided in the second retaining chamber;
   E. thereafter recirculating the liquid continuum containing solids from the second retaining chamber into the comminuting means at one end thereof at a rate of at least about 30 volumes of the liquid continuum containing solids in the comminuting means per hour;
   F. grinding said solids in the comminuting means as in step C as the recirculated liquid continuum steadily passes through the comminuting means;
   G. discharging the liquid continuum containing solids from the comminuting means at an end substantially opposite the recirculation to the means into a third retaining chamber at a streaming speed of at least about 30 volumes of liquid continuum containing solids in the comminuting means per hour until a batch is provided in the third retaining chamber; and
   H. repeating steps B through G until the solids in the batch are reduced to desired particle size.

57. A particulate ferromagnetic material having increased magnetic capabilities as set forth in claim 56 wherein:
   the ferromagnetic material is a barium ferrite.

* * * * *